United States Patent [19]

Poorman

[11] Patent Number: 4,616,279
[45] Date of Patent: Oct. 7, 1986

[54] ELECTRICAL CONNECTIONS FOR THIN FILM TRANSDUCER HEADS

[75] Inventor: Paul W. Poorman, Boise, Id.

[73] Assignee: Hewlett Packard Company, Palo Alto, Calif.

[21] Appl. No.: 496,028

[22] Filed: May 19, 1983

[51] Int. Cl.⁴ ................. G11B 15/64; G11B 17/32; G11B 21/20
[52] U.S. Cl. .................................. 360/103; 360/128
[58] Field of Search ............. 360/123, 108, 104, 103, 360/107, 128; 361/398, 408; 174/117 F, 117 FF

[56] References Cited

U.S. PATENT DOCUMENTS 3,696,351 10/1972 Groom et al. .................. 360/103
4,141,050 2/1979 Wiseley ........................... 360/104

FOREIGN PATENT DOCUMENTS 52-12815 1/1977 Japan .................... 360/103
53-19015 2/1978 Japan .................... 360/103

Primary Examiner—Stuart N. Hecker
Assistant Examiner—Benjamin E. Urcia
Attorney, Agent, or Firm—Leslie G. Murray

[57] ABSTRACT

Electrical connections between the read/write elements on the magnetic transducer head and the circuitry associated therewith (usually an amplifier/driver integrated circuit chip) are provided by means of fine, flat conductive wires encapsulated in a plastic film. At points where the wires need to make substantial angular turns, portions of the plastic film are removed so as to permit such turns to be accomplished without unacceptably increasing the stiffness of the connections which would adversely affect the aerodynamic properties of the transducer head as it "flies" over a spinning magnetic recording disc.

4 Claims, 1 Drawing Figure

ELECTRICAL CONNECTIONS FOR THIN FILM TRANSDUCER HEADS

TECHNICAL FIELD

This invention relates to magnetic recording and reading apparatus of the type employing a rigid magnetic disc as a recording medium. More particularly, the invention relates to a thin film reading and writing transducer head capable of writing (recording) inductively and reading magnetoresistively, and to the electrical connections therefor.

BACKGROUND OF THE INVENTION

Magnetic transducer heads employing laminated assemblies of ferrite materials permit the attainment of heads having transducing gaps of very small length only with great difficulty, particularly in manufacturing. The high data recording densities required by modern-day data processing demands very narrow transducing gaps in the sensing elements as well as extremely close-flying heights of these elements relative to the magnetic recording medium (normally a high-speed spinning magnetic disc). Such desirable features are realized by fabricating a transducer head using thin film techniques and structures.

In inductively writing/magnetoresistively reading heads, such as described in the co-pending application of Jackson et al., Ser. No. 482,654, filed Apr. 4, 1983 and assigned to the instant assignee, separate circuits are required for the writing and reading functions. In more conventional heads where reading and writing are accomplished inductively only, the same circuit connections can perform both functions. Usually, in such inductively writing and reading heads, only two conductors are required to make the connections to the head since the same inductive elements perform both the writing and reading operations at different times. In a head employing magnetoresistance to read and magnetic induction to write, separate elements for each operation are utilized necessitating the use of four conductors to connect such a head to its associated circuitry, two for the magnetoresistive read elements and two for the inductive write elements.

In addition, due to the very high write currents required to operate a head which employs only a single turn for writing (as contrasted to more conventional heads utilizing eight or more turns), the conductors to the head must be substantially larger in cross-section to carry such currents. The use of a single writing turn is highly desirable in order to minimize the size and area of the transducer head structure so as to permit the attainment of higher reading and writing speeds on small diameter recording media or discs. In other words, the smaller the dimensions of the head, the more it is able to write and read compactly recorded data on the disc. This permits the use of smaller diameter discs to retain as much if not more magnetically recorded information than otherwise. For conventional heads (that is, heads which inductively write and read), utilizing a large number of writing turns, a typical writing current may be about 50 mA. For a head employing only a single turn, the writing current may be ten times that amount. This dictates the use of wires having a cross-sectional area of no more than 0.003 mm$^2$ as compared to conventional multi-turn heads where the cross-sectional area may be 0.0008 mm$^2$. It will be understood that wires of larger cross-sectional area become stiffer and when connected to the transducer head impair the "flying" performance thereof. The invention permits providing the necessary four conductors to the transducer head without adversely affecting its "flying" characteristics, particularly the flying height which is a critical consideration.

Due to the high writing currents and the low reading output voltages in an inductively writing/magnetoresistively reading head, the head itself should be as close as possible to an amplifier/driver integrated circuit chip. Longer wiring schemes result in excessive noise and the introduction of unacceptably high inductances and capacitances. It has been found, therefore, that the maximum permissible distance between the head and its associated amplifier/driver chip should be no more than about 25 mm.

In many disc drive applications of the type contemplated for use with inductively writing/magnetoresistively reading heads it is often desirable that at least two recording discs be vertically stacked and that each side of each disc be provided with an inductively writing/magnetoresistively reading head. Because of necessary limitations on the available spacing between such stacked discs, the connecting wiring to each head between the discs is limited in thickness. In one embodiment, the available space limits the connecting wire and the plastic film within which the wires are contained to no more than 0.2 mm. The present invention, in addition to its other advantages, permits such connections to be made within this spacing, again without adversely affecting the performance of the "flying" transducer heads.

SUMMARY OF THE INVENTION

The present invention solves these problems by utilizing very fine, flat conductive wires or ribbons which are encapsulated in a plastic film having the appearance of tape. In order to permit the conductors to make substantial angular turns (i.e., 180°) portions of the conductors are exposed or stripped of the encapsulating film at those points where turns are desired. While this leaves the conductive wires or ribbons unsupported for a portion of their length at these points, the ribbons can be bent or turned as desired to reach necessary connection areas on a thin film transducer head, for example, without touching each other and without breaking. Since the ribbons are flat, they can readily accommodate turns in the plane of their principal axis which round wires could not accomplish and which also would not be possible if turns were attempted without removing the plastic film encapsulant. Another variation in the practice of the invention is to leave a small strip or strips of film in situ and bonded to the ribbon conductors at spaced intervals along the length of the ribbon conductors where major portions of the film have been removed. Such a strip serves to maintain the spacing of the conductors at their unsupported portions. Due to the small size and weight, as well as to the shape, of the conductors, they may be employed on a Winchester-type head assembly without adding significantly to the mass thereof and without adversely affecting the flying characteristics of the slider to which the conductors are ultimately attached.

BRIEF DESCRIPTION OF DRAWING

The sole FIGURE is an exploded view in perspective of an inductive-write/magnetoresistive-read head mechanism according to the invention.

DETAILED DESCRIPTION OF THE INVENTION

Figure 1:
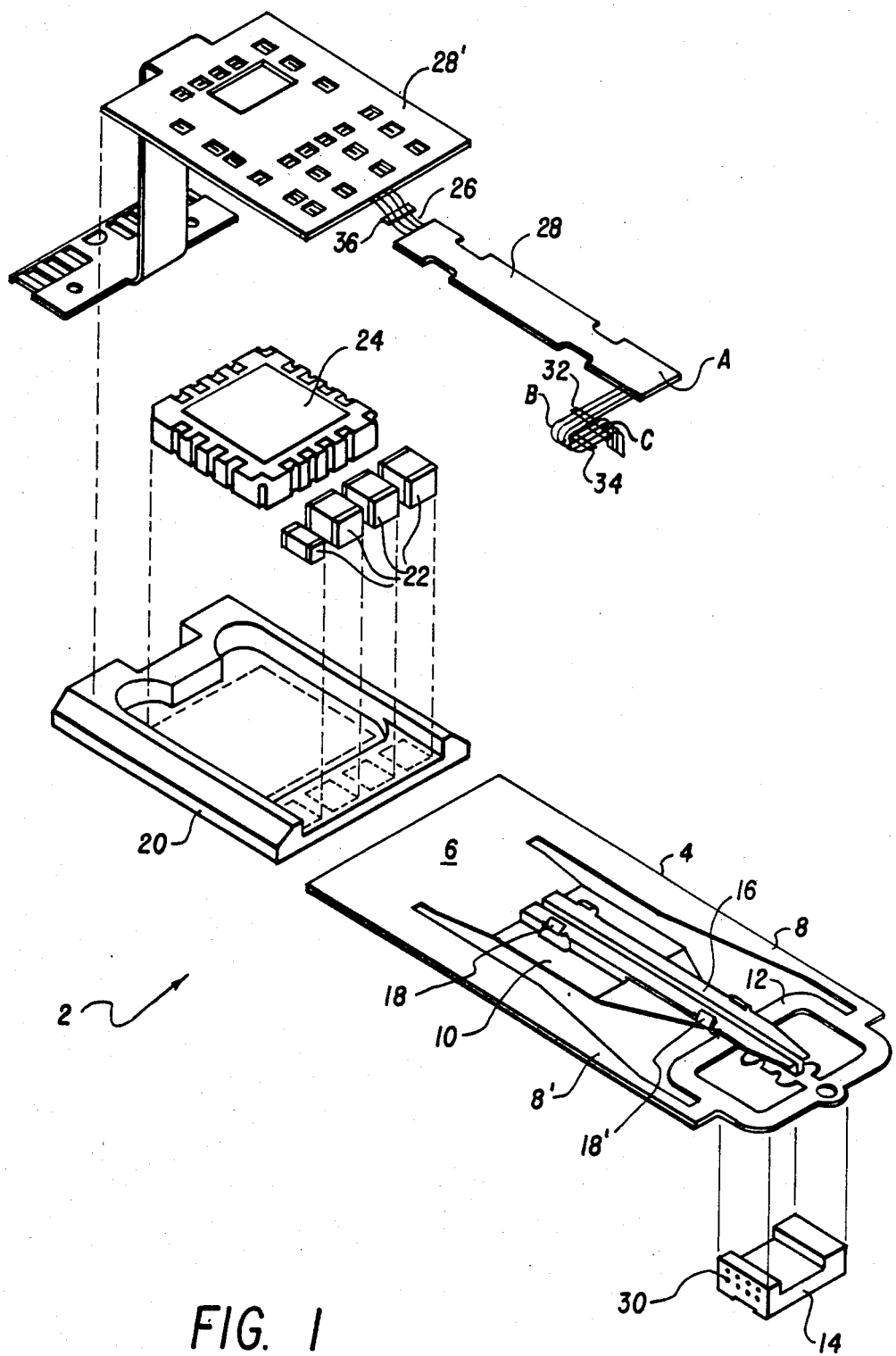

Referring now to the drawing, a writing (recording)/reading head mechanism 2 is shown comprising a flexure support member 4 which may be of stainless steel about 0.05 mm. thick and having a base portion 6, a pair of side arms or legs 8, 8' and a central tab member 10 extending between and in the same direction as the legs 8, 8'. This flexure member 4 may be about 32 mm. long and about 14 mm. wide. Integral with and positioned between the end of the legs 8, 8' remote from the base portion 6 is a rectangularly shaped frame member 12 which supports an air-bearing slider member 14 which carries the inductive reading and magneto-resistive writing elements (not shown) of the recording head. The frame member 12 is so oriented that its longest sides are at right angles to the supporting legs 8, 8'. The outermost tip of the central tab member 10 extends over the central portion of the frame member 12 and provides a counteracting force thereon so as to limit the upward movement thereof during operation of the head. This is necessary to obtain the proper flying height for the slider 14 as it "flies" over the surface of a spinning magnetic disc (not shown) on which information is recorded or read. It will be appreciated that all of these elements are of the same thickness and are integral with each other and lie in substantially the same plane. Preferably they are stamped from an initial stainless steel blank. On the top surface of the central tab member 10 is a metal strip 16 secured thereto by means such as tabs 18 which are bent over to hold the metal strip 16 in place.

The base portion of the flexure member 4 is secured to a flexure base support member 20 which may be of aluminum because of its light weight and high thermal conductivity. The flexure base member 20 may be a substantially open rectangular frame about 16.4 mm. long and of the same width (i.e., 14 mm.) as the flexure member 4. The base member 20 is adapted to receive and support a plurality of capacitor chips 22 and an integrated circuit read-write chip 24 which may constitute the read circuit preamplifier.

According to the present invention, the read/write elements on the slider 14 are connected to the integrated circuit chip 24 and the capacitor chips 22 by a plurality of flat copper conductors 26 embedded in a plastic film 28. (An extension of the same flat tape conductor film may also be utilized to connect the elements of the integrated circuit chip 24 to further utilization circuits and/or equipment by the portion 28 of the conductors.) However, the invention is primarily concerned with the connections between the read/write head elements on the slider 14 and the integrated circuit chip assembly 22, 24. Since the conductors 26 extend on the top of and along the major axis of the flexure member 4 to the slider 14 which is located beneath the flexure member 4, the conductors must make at least a right angle turn to reach the slider element 14. In addition, since the slider element 14 is wider than the flat tape conductor film 28 and since the connection pads 30 on the slider 14 are located on a vertical surface of the slider 14, the conductors must make, as a minimum, a first right angle turn (at point A) with respect the major axis of the conductor tape 28 to extend outwardly from the flexure member 4 and then at least one more right angle turn to travel downwardly to the connection pads 30 on the slider 14. However, in order to permit the conductors to accommodate vertical movement of the slider element 14, a sufficient length of the conductors may be provided to permit looping thereof before the final vertical descent to the slider element 14. Hence, after the conductors 26 make the initial 90 degree turn (at point A), they extend outwardly a predetermined distance and are turned 180 degrees at point B and then turned 90 degrees downwardly at point C so as to pass through the opening in the rectangularly shaped frame member 12 and eventually reach the connection pads 30 on the side of the slider 14 therebeneath. None of these turns could be accomplished with round wires or flat conductors encapsulated in a plastic film without, at least, an unacceptable increase in stiffness which would impair the movement of the slider element 14 which, during operation, must be able to be aerodynamically supported above the surface of the spinning recording disc therebeneath. This requires that there be little or no resistance to vertical movement of the slider 14.

In order to permit such turning and flexing of the conductors 26, the present invention involves removal of portions of the supporting plastic film beginning about at the first right angle turn (Point A) and continuing to the end of the conductors where they are attached to the connection pads 30 on the slider 14. It is a further requirement, of course, that these conductors (typically 4 in number) not contact each other where they are exposed and are free of the insulating plastic film 28. In view of the number of turns involved, and particularly the 180 degree looping turn, maintaining spacing and isolation from each other of these conductor is accomplished by leaving narrow strips of the plastic film in situ across the conductor 26 at various locations along the exposed length thereof. Thus a first plastic strip 32 is left in place between turn A and the 180 turn (B); a second such plastic strip 34 is left in place immediately after the 180 degree turn at point B. Finally, a third plastic strip 36 is left in place just before the final downward 90 degree turn at point C. The spacing between the wires after this final turn (C) to the ends of the wires is accomplished by the soldering of these wires to their respective connection pads 30 of the slider 14.

The same principle may be utilized to permit taking the conductors 26 upwardly at their other ends in order for them to surmount the integrated circuit chip assembly 22, 24. Thus, a predetermined portion of the encapsulating plastic may be removed at this point and the spacing between conductors 26 maintained by leaving a plastic strip 38 in situ around the conductors 26.

It will be appreciated that desired portions of the plastic film may be removed by standard photoresist masking and etching techniques well known in the industry. In addition, and preferably, the initial 90 degree turning of the conductors at point A may be realized by utilizing a portion of encapsulated flat conductor tape in which this 90 degree turn is pre-fabricated in the tape by the manufacturer. It will also be appreciated that the flat conductor tape 28 is mounted on the central tab member 10 and atop the metal strip 16 by means of the previously described tabs 18 which also hold the metal strip 16 in place, and by tab extensions 18' of the metal strip 16.

There thus has been described and shown an improved connection arrangement for a read/write head which permits the use of small flat wires which can be bent or turned as described without adversely affecting the "flying" performance of the head itself.

What is claimed is:

1. In a magnetic transducer mechanism having a write/read transducer member carried by a flexure support member, and electrical connection means comprising a plurality of electrical conductors encapsulated in an electrically insulating film, said electrical connection means extending along the length of said flexure support member, said electrical connection means for providing electrical connections to said write/read transducer member, an improvement comprising: said electrical connection means having predetermined portions of said electrically insulating film removed from said plurality of electrical conductors such that said electrical connection means is encapsulated in said film along straight portions of said conductors and devoid of said film along bent portions thereof, whereby said plurality of conductors turn in a predetermined angle to permit greater flexibility and substantially eliminate bias effects resulting from an increase in stiffness of said electrical connection means when said conductors encapsulated in said film are bent.

2. The invention as in claim 1 wherein a bent portion of said plurality of electrical conductors devoid of said film between said flexure support member and said write/read transducer member forms at least one turn of a predetermined angle.

3. The invention as in claim 2 wherein at least one narrow strip of said electrically insulating film remains in situ along said bent portions where said plurality of electrical conductors turn to maintain each of said plurality of electrical conductors in spaced-apart relationship with each of the other said plurality of electrical conductors and to provide electrical isolation of each of said plurality of conductors.

4. The invention as in claim 3 wherein a bent portion of said plurality of electrical conductors between said flexure support member and said write/read transducer member forms a 180 degree turn.

* * * * *

UNITED STATES PATENT AND TRADEMARK OFFICE
CERTIFICATE OF CORRECTION

PATENT NO. : 4,616,279
DATED : October 7, 1986
INVENTOR(S) : Paul W. Poorman

It is certified that error appears in the above-identified patent and that said Letters Patent is hereby corrected as shown below:

Column 5, line 4 of the Patent, delete "described", insert --desired--.

Signed and Sealed this

Twenty-second Day of December, 1987

Attest:

DONALD J. QUIGG

*Attesting Officer*  *Commissioner of Patents and Trademarks*